(12) United States Patent
Ramaraj et al.

(10) Patent No.: US 8,576,841 B2
(45) Date of Patent: Nov. 5, 2013

(54) HYBRID PORT RANGE ENCODING

(75) Inventors: Balamurugan Ramaraj, San Jose, CA (US); Gopi Krishna, Union City, CA (US); Ananda Sathyanarayana, Santa Clara, CA (US); Apurva Mehta, Cupertino, CA (US); Murtuza Attarwala, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 245 days.

(21) Appl. No.: 13/174,437

(22) Filed: Jun. 30, 2011

(65) Prior Publication Data

US 2013/0003727 A1 Jan. 3, 2013

(51) Int. Cl.
*H04L 29/02* (2006.01)
(52) U.S. Cl.
USPC .......................................................... 370/389
(58) Field of Classification Search
USPC .......................................................... 370/389
See application file for complete search history.

(56) References Cited

U.S. PATENT DOCUMENTS

| | | | | |
|---|---|---|---|---|
| 8,374,182 | B2 * | 2/2013 | Mehta et al. | 370/390 |
| 2002/0133586 | A1 * | 9/2002 | Shanklin et al. | 709/224 |
| 2006/0036907 | A1 * | 2/2006 | Inscoe et al. | 714/12 |

OTHER PUBLICATIONS

"3GPP TS 23.401—General Packet Radio Service (GPRS) enhancements for Evolved Universal Terrestrial Radio Access Network (E-UTRAN) access," version 10.0.0, 3rd Generation Partnership Project, Technical Specification Group Services and Systems Aspects, Jun. 2010, 261 pp.

"3GPP TS 36.300—Evolved Universal Terrestrial Radio Access (E-UTRA) and Evolved Universal Terrestrial Radio Access Network (E-UTRAN) Overall Description," Released 10, 3rd Generation Partnership Project, Technical Specification Group Radio Access Network, Jun. 2010, 183 pp.

"3GPP TS 23.203—Policy and charging control architecture (Release 10)," Version 10.1.0, 3rd Generation Partnership Project, Technical Specification Group Services and System Aspects, Sep. 2010, 132 pp.

Liu, "Efficient Mapping of Range Classifier into Ternary-CAM," in the Proceedings of the 10th Symposium on High Performance Interconnects (HOTI), Aug. 21-23, 2002, pp. 95-100.

Lakshminarayanan, "Algorithms for Advanced Packet Classification with Ternary CAMs," SIGCOMM'05, Aug. 21-26, 2005, 12 pp.

Gupta, "Packet Classification on Multiple Fields," Abstract, Jun. 7, 1999, 14 pp.

Taylor, D.E: "Survey and Taxonomy of Packet Classification Techniques," ACM Computing Surveys, vol. 37, No. 3, Sep. 3, 2005, pp. 238-275.

Song, H: Lockwood, J.W.: "Efficent Packet Classification for Network Intrusion Detection Using FPGA," FPGA, 2005, Feb. 20, 2005, pp. 238-245.

(Continued)

*Primary Examiner* — Sulaiman Nooristany
(74) *Attorney, Agent, or Firm* — Shumaker & Sieffert, P.A.

(57) ABSTRACT

In general, techniques are described for encoding port ranges. In one example, a method includes generating an encoded value that represents a specified port range including a first element storing an identifier that identifies a frequently occurring port range stored in an associative data structure of most frequently occurring port ranges, a second element storing an index that represents a dynamically-learned port range specifying at least a part of the specified port range, the dynamically-learned port range represented in a tree-structure of dynamically-learned port ranges and identified by the index, and applying, by a forwarding plane of the computing device, one or more filters associated with the encoded value to a packet that specifies a port included in the specified port range.

22 Claims, 5 Drawing Sheets

(56) References Cited

OTHER PUBLICATIONS

Woo T Y C: "A modular Approach to Packet Classification Algorithms and Results," Infocom 2000, Nineteenth Annual Joint Conference of the IEEE Computer and Communications Societies Proceedings, Mar. 26-30, 2000, pp. 1213-1222.

Extended Search Report from European application No. 12173103.8, dated Nov. 5, 2012, 8 pp.
Examination Report from corresponding European application No. 12173103.8, dated Aug. 7, 2013, 6 pages.

* cited by examiner

HYBRID PORT RANGE ENCODING

TECHNICAL FIELD

The invention relates to computer networks and, more particularly, to techniques for filtering data within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form.

Certain devices within the network, such as routers, maintain routing information that describes routes through the network. Each route defines a path between two locations on the network. From the routing information, the routers may generate forwarding information, which is used by the routers to relay packet flows through the network and, more particularly to select specific next hops for each packet flows. In reference to forwarding a packet, the "next hop" from a network router typically refers to a neighboring device along a given route. Conventional routers often maintain the forwarding information in the form of one or more forwarding tables, radix trees or similar data structures. Upon receiving an incoming packet, the router examines information within the packet to select a next hop for the packet in accordance with one of the forwarding tables.

Routers and other network devices, such as firewalls, gateways, and switches, often apply filters when processing packet flows. For example, a router may compare header information within each packet to a set of filtering rules, which specific "terms" or "criteria" and one or more actions. The filtering rules may specify, for example, particular source IP addresses, destination IP addresses, and other criteria for identifying packets as well as one or more actions to perform on packets that match the specified criteria. Specifically, the router identifies packets that match the filtering rules and performs the one or more actions on the packets depending on which filtering rule(s) the packets match. The actions may include dropping the packet, remarking the packet as lower priority, counting packets that match the filtering rule, replicating the packet for logging or further analysis, and the like. For example, a filter may be installed within a router to cause the router to drop packets having a source IP address of a device that has been identified as sourcing a denial of service (DoS). Conventional routers typically apply the filters to packet flows based on the interfaces from with the flows are received, i.e., on an interface-by-interface basis. For instance, the router may apply an interface-specific filter to each of the packet flows received by a given interface. Alternatively, or in addition, the routers may apply packet filters to all packet flows regardless of the interface from which the packet.

SUMMARY

In general, techniques for encoding filter criteria are described. The techniques may, for example, reduce the resources required to store filters in memory (e.g., content addressable data structures) and to improve performance. In some examples, the techniques are applied to encode a port range specified by the filter. To represent a port range specified by the filter, techniques of the present disclosure may generate encoded values that include multiple elements. A first element of an encoded value may include an identifier that identifies a frequently occurring port range. For instance, techniques of the present disclosure may maintain a group of one or more frequently occurring port ranges that are each identified by a unique identifier. When encoding a port range that matches a frequently occurring port range, techniques of the present disclosure may generate an encoded value that stores the identifier associated with the port range in the first element. In this way, a single encoded value may represent a frequently occurring port range thereby reducing the number of encoded values required to represent a port range and improving storage efficiency.

Techniques of the present disclosure further provide for efficient storage of multiple, different port ranges that do not match frequently occurring port ranges. In some examples, a port range specified by a filter may not match a frequently occurring port range. In such examples, techniques of the present disclosure may store the specified port range and further identify the port range by an index value. In this way, techniques of the present disclosure may dynamically learn port ranges not included in the group of frequently-occurring port ranges. A second element of an encoded value may store an index value that represents the dynamically-learned port range, thereby representing the dynamically-learned port range with only a single or few encoded values. In this way, techniques of the present disclosure may efficiently represent frequently-occurring and dynamically-learned port ranges using only one or a few encoded values. By representing port ranges using encoding techniques of the present disclosure, storage resources may be used efficiently when filters are applied to many different packets flows of different subscribers.

In one example, a method includes generating, by a computing device, an encoded value that represents a specified port range including a first element storing an identifier that identifies a frequently occurring port range stored in an associative data structure of most frequently occurring port ranges, a second element storing an index that represents a dynamically-learned port range specifying at least a part of the specified port range, the dynamically-learned port range represented in a tree-structure of dynamically-learned port ranges and identified by the index, and applying, by a forwarding plane of the computing device, one or more filters associated with the encoded value to a packet that specifies a port included in the specified port range.

A network device that includes an encoding module that generates an encoded value that represents a specified port range including a first element storing an identifier that identifies a frequently occurring port range stored in an associative data structure of most frequently occurring port ranges, a second element storing an index that represents a dynamically-learned port range specifying at least a part of the specified port range, the dynamically-learned port range represented in a tree-structure of dynamically-learned port ranges and identified by the index. The network device also includes a forwarding plane that applies one or more filters associated with the encoded value to a packet that specifies a port included in the specified port range.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
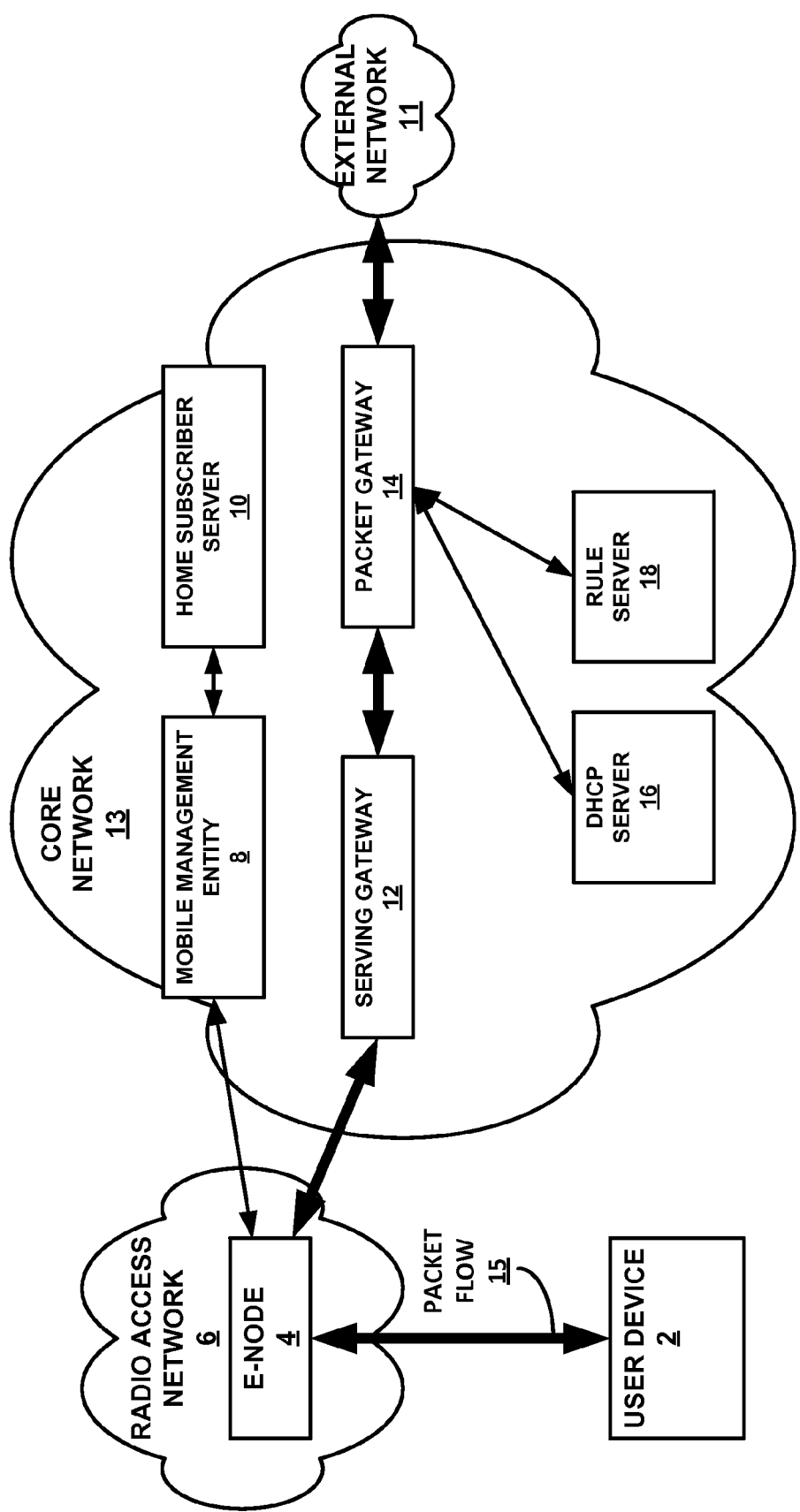
FIG. 1 is a block diagram illustrating an example system in which routers filter packet flows associated in accordance with the techniques of this disclosure.

FIG. 1 is a block diagram illustrating an example of a user device 2 that connects to an external packet-based network 22 (e.g., the Internet) via a radio access network 6 and core network 13. A shown in FIG. 1, user device 2 may be any computing device. For instance, user device 2 may be a portable computing device (e.g. mobile phone/netbook/laptop/tablet device) or a desktop computer having cellular or other radio frequency communication capabilities. User device 2 may connect to e-node 4 via radio access network 6 using wireless communications hardware included in user device 2 such as a 3G, 4G or LTE radio compliant components.

E-node 4 includes hardware, such as a radio frequency transmitter, that communicates directly with wireless communications hardware included in user device 2. The radio frequency transmitter facilitates the communication of data from user device 2 to e-node 4. E-node 4 in some examples also includes a radio network controller. The radio network controller of e-node 4 provides radio resource management of radio access network 6. Radio resource management may include system level control of co-channel interference, managing transmission power, channel allocation, data rates, handover criteria, modulation scheme, error coding scheme. In this way, radio network controller may utilize limited radio spectrum resources and the infrastructure of radio network 6 in an efficient manner.

E-node 4 provides user device 2 with access to a radio access network 6. Radio access network 6 serves as an access network that enables user device 2 to transmit data to core network 13. User device 2 connects radio network 6 via a radio channel provided e-node 4. User device 2 further communicates data via radio network 6 using various well-known multiplexing schemes such as frequency division multiplex (FDM), time division multiplex (TDM), code division multiplex (CDM), and space division multiplex (SDM). Data received from user device 2 at e-node 4 is further transmitted to core network 13.

Core network 13 includes any type of network capable of transmitting data, such as a layer three (L3) packet-switched network operating over one or more layer two (L2) networks (e.g., an Ethernet or multi-packet label switching (MPLS) network) that may be used to transmit data from radio access 6 to networks such as the Internet 22. Core network 13, in some examples, is comprised of network elements that represent any communication devices such as switches, routers, links, and other devices capable of transmitting data. Core network 13 may manage access and communication of data from user device 2 to other external networks 22 such as the Internet. Core network 13 establishes and operates bearers to transport user traffic, in the form of "packets." In general, a bearer is a set of network resources and data transport functions in core network 13 to deliver user traffic between two network entities. A bearer may include a path, a logical connection, or a physical or wireless connection between two network devices. A bearer may comprise, for example, an Evolved Packet System (EPS) bearer.

Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

Components of core network 13 may provide various services such as packet routing, quality of service, user device authentication, billing/charging, and policy enforcement. Components of core network 13 include mobile management entity (MME) 8, home subscriber server (HSS) 10, serving gateway 12, packet gateway 14, dynamic host configuration protocol (DHCP) server 16, and rule server 18. Components of core network 13 may be implemented in any combination of hardware and or software and may be interconnected via core network 13.

As shown in FIG. 1, MME 8 receives data communications from e-node 4. MME 8 is responsible for a variety of functions to facilitate connectivity between user device 2 and core network 13. For instance, MME 8 typically assigns unique identifiers to each user device connected to radio access network 6. Examples of unique identifiers may include tunnel identifiers or Internet Protocol (IP) addresses. MME 8 is also responsible for authenticating user devices on core network 13. For example, MME 8 may receive one or more authentication credentials from user device 2. MME 8 may verify the authentication credentials are authentic by querying HSS 10 or other AAA device. HSS 10 includes a centralized database that includes subscription and user-related data including authentication data. HSS 10 further includes data for mobility management, and call and session establishment support. If the authentication credentials are not authentic, MME 8 may deny user device 2 access to external network 11.

As shown in FIG. 1, components of core network 13 may further include serving gateway 12. Serving gateway 12 in some examples, routes and forwards user data packets received from user device 2. Serving gateway 12 may also serve as a mobility anchor when user device 2 transitions from one e-node 4 to another. For example, as a user moves away from a first location that includes e-node 4 and closer to a second location that includes a second, different e-node, user device 2 may switch connections from e-node 4 to the second e-node. In this way, user device 2 may seamlessly switch between different radio access networks without interrupting the user device session. Although user device 2 may switch between radio access networks, serving gateway 12 manages data communications received from user device 2 via the various, different e-nodes.

Core network 13 may further include packet gateway 14. Packet gateway 14 provides connectivity for data communication from user device 2 to external network 11. Packet gateway 14 may provide a variety of functions including policy enforcement, packet filtering for each user, and packet screening. To provide such functionality, packet gateway 14 may further communicate with other components of core network 13 such as DHCP server 16 and rule server 18. DHCP server 16 may provide automatic configuration of Internet Protocol (IP) addresses for user device 2.

In some examples, user device 2 attaches to core network 13, which establishes a core network session and a default bearer to carry user traffic for the wireless device as part of an attach procedure. The core network session is an association between core network 13 and user device 2 that is identifiable by a combination of a user device 2 address and an Access Point Name (APN) for external network 11. Besides establishing a default bearer, the attach procedure may trigger establishment, by core network 13, of one or more dedicated bearers between packet gateway 14 and user device 2 to carry user traffic. Dedicated bearers operate according to a different set of quality of service (QoS) parameters and thus provide QoS differentiation to packet flows of various services engaged by user device 2. For example, various dedicated bearers may provide different guaranteed bit rates (GBR bearers) (or may not provide a guaranteed bit rate), maximum bit rates (MBRs), priority, packet delay budget, packet error loss rate, and allocation and retention priority (ARP) characteristics. A particular bearer may transport packet flows for multiple service sessions of a core network session when the QoS characteristics of the bearer match the requirements of the service sessions. In an IP-based content access network 4, a core network session comprises an IP-core network session.

Packet gateway 14 implements policy and charging control (PCC) functionality for core network 4. An operator and/or an external entity, such as a Policy and Charging Rules Function entity, e.g., rule server 18, provisions packet gateway 14 with one or more PCC rules that each specify a set of information enabling the detection of a service data flow and providing policy control and/or charging control parameters. PCC rules may include one or more filters. Packet gateway 14 enforces service flow-based policy and charging control according to the PCC rules. Further details regarding policy and charging control are found in "3GPP TS 23.203—Policy and Charging Control Architecture (Release 10)," Version 10.1.0, 3rd Generation Partnership Project, Technical Specification Group Services and System Aspects, September 2010, which is incorporated herein by reference in its entirety.

A PCC rule includes a rule identifier that uniquely identifies the rule within a session, service data flow detection information, charging information, and/or policy control information. Generally, a session may include a tunnel existing between user device 2 and packet gateway 14. Policy control information specifies parameters for gating control (i.e., permit/deny), QoS control, and QoS signaling. Service data flow detection information includes a precedence value and a service data flow template that specifies traffic mapping information to identify packet flows for a service session. Traffic mapping information may include one or more packet filters that include parameters that characterize packet flows according to, for example, the IP 5-tuple consisting of the source address, destination address, source port, destination port, and transport protocol specified in IP packet headers, other packet header information, and/or information obtained from Deep-Packet Inspection (DPI). The set of packets detected by applying the service data flow template of a particular PCC rule are referred to as a service data flow. A service data flow may include packets for multiple service sessions. Packet filters of a service data flow template may be alternatively referred to herein as service data flow filters.

Packet gateway 14 associates service data flows (and, by extension, the corresponding PCC rule) to particular bearers for a core network session during a binding process to ensure that packet flows within the services data flows receive an appropriate QoS from core network 13. For a given PCC rule, packet gateway 14 analyzes policy control information therein to determine whether an existing bearer for the relevant core network session is sufficient to provide the requisite QoS. If not, packet gateway 14 initiates establishment of a new, suitable bearer. Packet gateway 14 creates bindings between (or "binds") one or more service data flows and the bearer that matches the QoS specified in corresponding PCC rules for the service data flows. A particular bearer established to provide a particular QoS scheme may thus carry packet flows matched by one or more PCC rules.

Packet gateway 14 evaluates service data flow templates of corresponding PCC rules for application to packets traversing the core network 13 boundary. During evaluation of a packet, matching a packet filter in a service data flow template for a PCC rule causes packet gateway 14 to map the packet to the bearer to which the PCC rule is bound.

In accordance with the techniques of this disclosure, to ensure a specified level of service across core network 13 in both the downlink and uplink directions, packet gateway 14 applies packet filters that include the same traffic mapping information as that found in a traffic template traffic mapping information. Packet filters may be included in rules stored on a rule server 18. Rule server 18 may include rules associated with users of core network 13. A rule may include one or more filters or filters sets that may be applied to a packet flow. In some examples, a set of filters when applied to a bearer may be referred to as a Traffic Flow Template (TFT). Different policies may be defined for different users and/or different packet flows. For example, different policies may be defined for various types of subscriber services. In some examples, filters may be applied to provide higher quality of service, which the user may pay for in higher subscriber fees. In other examples, filters may be used to enforce parental controls or provide priority to different types of packet flow such as multimedia, data, or voice.

Figure 2:
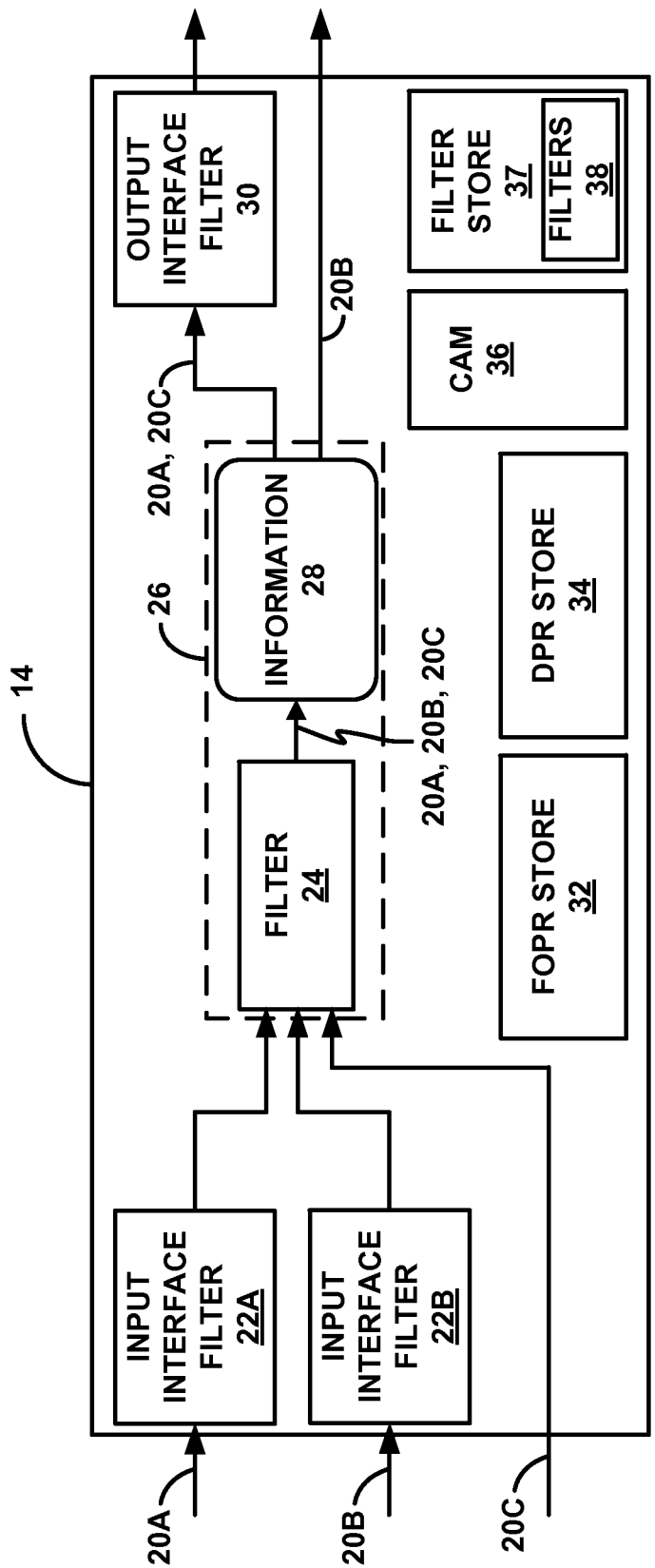
FIG. 2 is a block diagram illustrating an example flow of packets through a router of FIG. 1.
Figure 3:
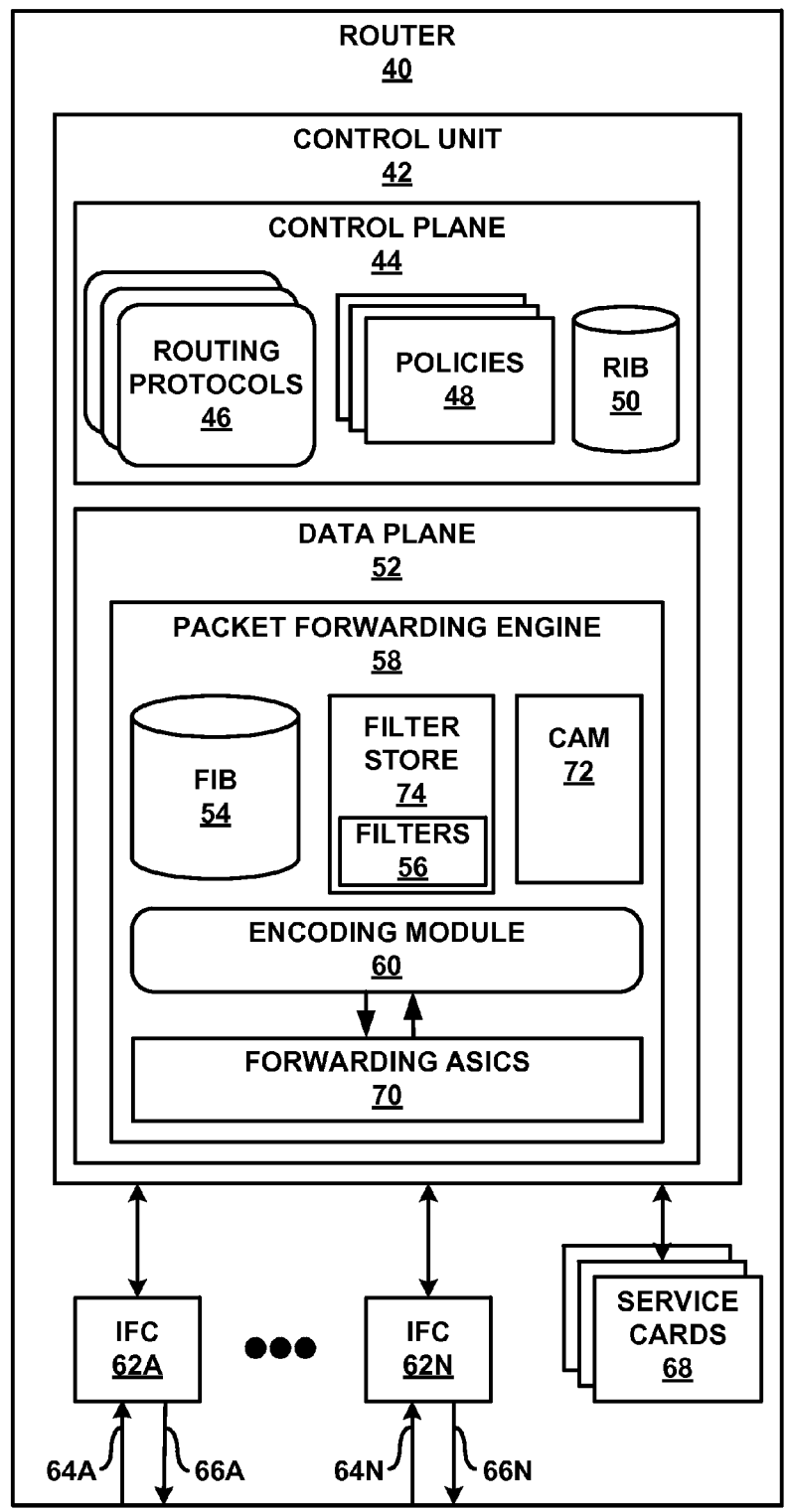
FIG. 3 is a block diagram illustrating an example router having an encoding module that operates in accordance with one or more techniques of this disclosure.

More generally, packet gateway 14, in some examples, identifies packets associated with different subscribers and handles such packets differently based on filters associated with a subscriber. For example, packet gateway 14 may examine packet headers of a packet flow. In one example, packet gateway 14 may inspect the source and destination port, protocol, and source and destination IP address of a packet, e.g., a five-tuple. Based on the header contents and the filters applied by packet gateway 14, packets may be dropped, re-prioritized, modified or allowed to continue to a destination specified in the header. FIGS. 2 and 3 further describe functionality of packet gateway 14.

As shown in FIG. 1, user device 2 may send and receive data packets that comprise packet flow 26. In one example, packet gateway 14 may initially determine that packet flow 26 originates from user device 2 and that user device 2 is associated with a particular user. Packet gateway 14 may therefore select one or more policies from rule server 18 that are associated with the user. The one or more policies may include one or more filters. Packet gateway 14 may apply the set of filters to packet flow 26.

In some examples, as the quantity of subscribers increase to millions, substantial resources of packet gateway 14 are used to store and select the filters for each subscriber. For example, a filter may specify a port range such that when a packet includes a port value within the port range, the filter is applied to the packet. Storing associations between filters and port ranges such that packet gateway 14 may select and apply filters may require substantial storage resources for millions of subscribers.

Aspects of the present disclosure provide techniques for encoding filter criteria. The techniques may, for example, reduce the resources required to store filters in memory (e.g., content addressable data structures) and to improve performance. In one example, packet gateway 14 may apply techniques of the present disclosure to encode a port range specified by a filter. To represent a port range specified by the filter, packet gateway 14 may generate encoded values that include multiple elements. A first element of an encoded value may include an identifier that identifies a frequently occurring port range. For instance, techniques of the present disclosure may maintain a group of one or more frequently occurring port ranges that are each identified by a unique identifier. When encoding a port range that matches a frequently occurring port range, techniques of the present disclosure may generate an encoded value that stores the identifier associated with the port range in the first element. In this way, the first element of a single encoded value may represent a frequently occurring port range thereby reducing the number of encoded values required to represent a port range and improving storage efficiency.

Techniques of the present disclosure further provide for efficient storage of multiple, different port ranges that do not match frequently occurring port ranges. In some examples, a port range specified by a filter may not match a frequently occurring port range. In such examples, techniques of the present disclosure may store the specified port range and further identify the port range by an index value. A second element of an encoded value may store an index value that represents the port range, thereby representing the port range with only a single or few encoded values. In this way, packet gateway 14, applying techniques of the present disclosure, may efficiently represent frequently-occurring and non-frequently occurring port ranges using only one or a few encoded values. Although FIG. 1, illustrates techniques of the present disclosure in the context of packet gateway 14, the techniques described herein may be generally applied to any network device capable of applying filters to packets.

FIG. 2 is a block diagram illustrating the flow of packets through packet gateway 14. Packet gateway 14 receives packet flows 20A-20C ("packet flows 20" also shown as "packet flow 15" of FIG. 1), and selectively applies input interface filters 22A-22B ("interface filters 22") to packet flows 20. In the illustrated example of FIG. 2, packet gateway 14 applies input interface filter 22A to packet flow 20A and input interface filter 22B to packet flow 20B. Packet gateway 14 does not apply an input interface filter 22 to packet flow 20C. Input interface filters 22 may include, for example, interface-specific filtering rules and associated actions, which packet gateway 14 may apply to packet flows 20.

Packet gateway 14 applies a filter 24 to packet flows 20 based on a table 26 used by packet gateway 14 to route the packets. Filter 24 includes table-specific filtering rules and associated actions that are applied to packet flows 20. In this manner, packet gateway 14 filters packets of packet flows 20 that correspond to table 26 with common rules.

Packet gateway 14 determines a next hop for packets of packet flows 20 from information 28, which may associate network destinations with specific next hops. Packet gateway 14 selectively applies an output interface filter 30 to packet flows 20. For instance, packet gateway 14 may apply an output interface filter 30 to packet flows destined for a particular next hop. In the example of FIG. 2, packet gateway 14 applies output interface filter 30 to packet flows 20A and 20C, and does not apply an output interface filter 30 to packet flow 20B. Although packet gateway 14 may include any number input interfaces 22 and output interfaces 30 associated with any number of tables 26, FIG. 1, for simplicity, shows only input interfaces 22 and output interface 30 associated with table 26.

As shown in FIG. 2, packet gateway 14 further includes frequently-occurring port range (FOPR) store 32, dynamically-learned port range (DPR) store 34, content-addressable memory (CAM) 36, filter store 37, and filters 38. Techniques of the present disclosure use FOPR store 32 to store frequently occurring port ranges and corresponding identifiers for each port range. DPR store 34 may further store port ranges not included in FOPR store 32 along with associated index values that identify port ranges in DPR store 34.

Applying techniques of the present disclosure, packet gateway 14 may generate an encoded value that may be stored in CAM 36, wherein the encoded value is further associated with a filter. The encoded value may represent a port range that corresponds to a port range specified by the filter. When a packet later arrives at packet gateway 14, the encoded values may be used to select filters 38 stored in filter store 37 that specify a port range matching the port value of the packet.

In some examples, a first element of an encoded value may include an identifier that identifies a frequently occurring port range stored in FOPR 32. Because the first element of a single encoded value may represent a frequently occurring port range, techniques of the present disclosure may reduce the number of encoded values stored in CAM 36 that are required to represent a port range.

Techniques of the present disclosure further store multiple, different port ranges that may not match frequently occurring port ranges in DPR store 34. In some examples, a port range specified by a filter may not match a frequently occurring port range. In such examples, DPR store 34 may store the specified port range and further identify the port range by an index value. Such port ranges may therefore be dynamically learned by packet gateway 14. A second element of the encoded value may store an index value that represents the port range of DPR store 34. In this way, the port range may be represented using only a single or few encoded values. Consequently, techniques of the present disclosure may efficiently represent frequently-occurring and dynamically-learned port ranges using only one or a few encoded values. The encoded values may further be associated with filters and stored in CAM 36. When packet gateway 14 receives a packet, a port value specified by the packet is used to generate a query value that is compared with encoded values stored in CAM 36. When the query value matches an encoded value of CAM 36, the filter associated with the encoded value is selected an applied to the corresponding packet.

FIG. 3 is a block diagram illustrating an example router 40 including an encoding module 60 that is configured in accordance with one or more techniques of this disclosure. For purposes of illustration, router 40 may be described below within the context of system 10 shown in the example of FIG. 1 and may represent any one of routers 12. In this example embodiment, router 40 includes control unit 42, interface cards (IFCs) 62A-62N (collectively, "IFCs 62"), and service cards 68.

Router 40 typically include a chassis (not shown in the example of FIG. 3 for ease of illustration purposes) having a number of slots for receiving a set of cards, including IFCs 64 and service cards 68. Each card may be inserted into a corresponding slot of a chassis for communicably coupling the card to a control unit 42 via a bus, backplane, or other electrical communication mechanism. IFCs 62 send and receive packet flows or network traffic via inbound network links 64A-64N (collectively, "inbound links 64") and outbound network links 66A-66N (collectively, "outbound links 66"). Inbound links 64 and outbound links 66 in some examples for common IFCs form common, physical communication media for the IFCs, which operate in full duplex mode. That is, in some examples, each of IFCs 62 is coupled to respective communication media that can send and receive data substantially simultaneously. In other examples, inbound links 64 and outbound links 66 form separate physical media for respective IFCs 62.

Control unit 42 may include one or more processors (not shown in FIG. 3) that execute software instructions, such as those used to define a software or computer program, stored to a computer-readable storage medium (again, not shown in FIG. 3), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 42 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 42 may also be divided into logical or physical "planes" to include a first control or routing plane 44, and a second data or forwarding plane 52. In some examples, control unit 42 may be further divided into a third logical or physical "plane," a service plane. That is, control unit 42 may implement three separate functionalities, e.g., the routing, forwarding and service functionalities, either logically, e.g., as separate software instances executing on the same set of hardware components, physically, e.g., as separate physical dedicated hardware components that either statically implement the functionality in hardware or dynamically execute software or a computer program to implement the functionality, or some combination of logical and physical implementations.

Control plane 44 of control unit 42 may provide the routing functionality of router 40. In this respect, control plane 44 may represent hardware or a combination of hardware and software of control unit 42 that implements routing protocols 50. Routing protocols 50 may include, for example, intermediate system to intermediate system (IS-IS), open shortest path first (OSPF), routing information protocol (RIP), border gateway protocol (BGP), or other routing protocols. By executing routing protocols 50, data plane 52 identifies existing routes through the network and determines new routes through the network. Control plane 44 stores routing information within routing information base (RIB) 50. The routing information may include information defining a topology of a network, such as network 14 of FIG. 1. Control plane 44 may resolve the topology defined by the routing information to select or determine one or more routes through network 14. Control plane 44 may then update data plane 52 in accordance with these routes to program data plane 52 with forwarding information stored within forwarding information base (FIB) 50.

Prior to forwarding a packet via one or more outbound links, data plane 52 may apply one or more filters 56 to the packet. Filters 56 may be stored in a filter store 74. Filter store 74 may be any suitable data structure to store filters 56 such as a database, lookup table, array, linked list, etc. In some examples, filters 56 specify one or more conditions and a set of actions to be performed on packets that match parameters that characterize packet flows according to, for example, the IP 5-tuple consisting of the source address, destination address, source port, destination port, and transport protocol specified in IP packet headers, other packet header information, and/or information obtained from Deep-Packet Inspection (DPI). The actions may include one or more of appending a label to the packet, removing or swapping a label on the packet, inspecting the packet for viruses, performing deep packet inspection on the packet, performing quality of service processing on the packet, blocking or dropping the packet or other services.

To apply one or more filters, data plane 52 includes a forwarding component, e.g., packet forwarding engine 58 that further includes FIB 54, content addressable memory (CAM) 72, encoding module 60 and forwarding application specific integrated circuits (ASICs) 70. Forwarding ASICs 70 may comprise one or more dedicated packet forwarding integrated circuits. In this example, CAM 72 is used to store pointers that identify filters 56, although any other type of readable memory structure may be used. CAM 72 comprises semiconductor memory and comparison circuitry that enables a search operation of contents in memory to complete in a single clock cycle.

In one example, CAM 72 may store one or more entries comprising encoded values associated with one or more filters. To select one or more one or more filters, CAM 72 compares a query value against the one or more encoded values of CAM 72 and returns pointers to filters 56 associated with encoded values that match the query value. For instance, PFE 58 may select one or more filters 56 from filter store 74 using the pointers to filters 56. The query value may be encoded according to the same techniques as the encoded values stored in CAM 72. For example, PFE 58 may invoke encoding module 60 to generate a query value from a port or port range specified by a packet. PFE 58 subsequently uses the query value to select filters associated with the port or port range specified by the packet from CAM 72.

In one example, each encoded value of CAM 72 represents an exact port value or a port range specified by one or more of filters 56. Each encoded value is associated with a filter that specifies the exact port or specified port range. In this way, when a packet is received, encoding module 60 may use port information included in the packet to generate a query value, which, in turn, is used by CAM 72 to select one or more filters associated with the query value. PFE 58 may program forwarding ASICs 70 with the selected filters and route the packet according to the filters. As further described in FIG. 4, encoding module 60 provides techniques to encode port ranges for efficient storage and retrieval of filters in CAM 72.

Figure 4:
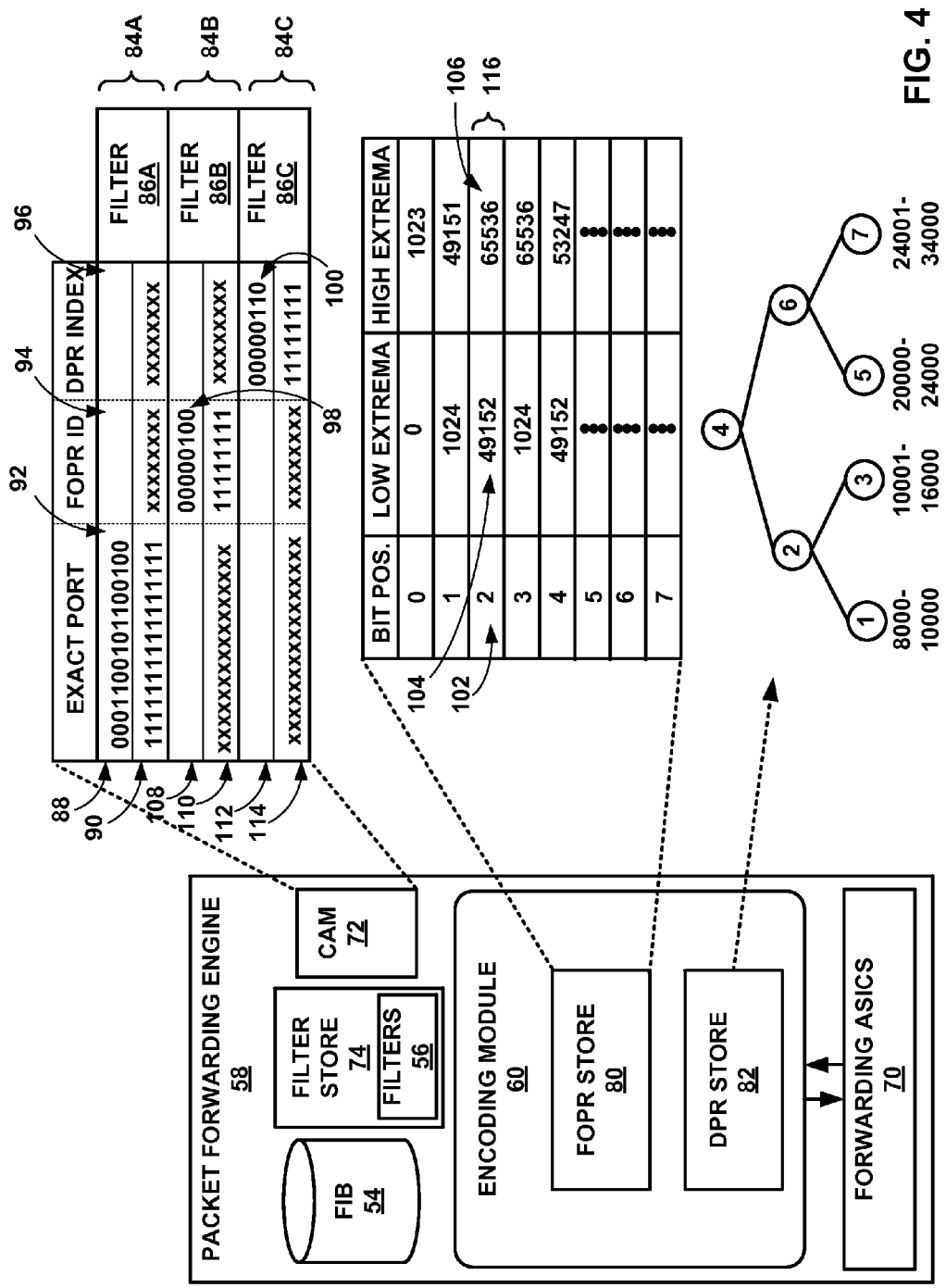
FIG. 4 is a block diagram that provides an expanded view of an example packet forwarding engine and data structures that encode port ranges in accordance with techniques described herein.

FIG. 4 is a block diagram that provides an expanded view of an example embodiment of PFE 58 and data structures included in encoding module 60. As shown in FIG. 4, PFE 58 includes FIB 54, CAM 72, encoding module 60, and forwarding ASICs 70. Encoding module 60 further includes frequently occurring port range (FOPR) store 80 and dynamically-learned port range dynamically-learned port range (DPR) store 82.

As described earlier in FIG. 3, CAM 72 may store entries each comprising an encoded value associated filter or storage location of filter data. Past techniques for representing port ranges in a CAM may inefficiently store port ranges, since the port ranges in such past techniques may span many CAM entries. For instance, in a conventional CAM that represents a port as a 16-bit value, a port range of 1024-65535 would typically need to be expanded into 6 separate CAM entries as shown below:

```
000001** **** ****
00001*** **** ****
0001 **** **** ****
001* **** **** ****
01** **** **** ****
1*** **** **** ****
```

If multiple port ranges are specified in a filter, the number of expansions is multiplied and therefore the number of CAM entries further increases. For example, if two port ranges are specified by a filter, and the port minima and maxima of each port range are represented as 16-bit values, there could be up to (2×16)×(2×16)=1024 expansions for a single filter. Thus, past techniques provided limited scalability.

In contrast to past technique, encoding techniques provided in the present disclosure may improve control plane performance (hardware update) and use fewer CAM entries, e.g., one entry in some cases, to represent port ranges associated with filters. For example, in some applications, only a small percentage of the filters actually use port ranges, and even when ranges are specified, some ranges are used with higher frequency (for e.g. 1023-65536 is used with higher frequency). Techniques of the present disclosure may avoid costly range encoding in the control plane for filters that don't specify a range. For those filters that do have ranges, encoding module 60 may encode frequently occurring port ranges efficiently and sometimes with at most one TCAM entry. Non-frequently occurring or "dynamic" ranges are handled effectively, by representing each "dynamic" range as an index in the encoded value. The index values may be managed by a tree data structure as further described herein. By avoiding rule decomposition for well-known/frequently used ports, and by eliminating the need to execute encoding logic for exact port ranges, overall control plane complexity may be reduced.

Example techniques disclosed in FIG. 4 generate 32 bit encoded values made up of three elements based on a port or port range associated with a filter. The three elements of an encoded value store, respectively, a 16 bit value to represent exact port numbers, a 8 bit value to represent an identifier of a frequently occurring port range, and a 8 bit value to represent an index of a dynamically-learned port rangedynamically-learned port range.

As shown in FIG. 4, CAM 72 may be a Ternary Content Addressable Memory (TCAM). CAM 72 includes one or more entries 84. Each entry in CAM 72 includes an encoded value 88, mask 90, and filter 86. Encoded value 88 may be generated by encoding module 60 according to example techniques described herein. To select one or more filters from CAM 72 in a lookup operation, a query value may be compared by CAM 72 with each encoded value stored in CAM 72 to identify one or more matching encoded values of entries 84. For each encoded value that matches the query value, CAM 72 may return the filter of the corresponding entry that includes the matching encoded value. In some examples, filter 86 may comprise a memory location that store the filter definition. In other examples, filter 86 may comprise the filter definition itself.

In some examples, mask 90 may be used to further improve lookup performance of CAM 72. For instance, mask 90 may include a string of bits comprising values of 0, 1, or X. When CAM 72 compares a query value to an encoded value, mask 90 is applied to the encoded value and the resulting value is then compared to the query value. Applying a mask value of 1 to a bit of an encoded value returns the same encoded bit value while applying a mask value of 0 to a bit of an encoded value returns a 1's complement of the encoded bit value. A mask value of X comprises a "don't care" value that causes CAM 72 to ignore bits of the encoded value to which the X is applied when performing a comparison. For instance, as shown in FIG. 4, CAM 72 ignores the 16 lowest ordered bits of encoded value 90 in a comparison operation because the 16 lowest ordered bits of mask 90 are don't care values. In one example, a query value includes 0001100101100100 in the 16 highest ordered bits. When performing a comparison to search for encoded values that match 0001100101100100 in the 16 highest ordered bits, CAM 72 may apply mask 90 to encoded value 80. Because the 16 lowest ordered bits of mask 90 are don't care values and the 16 highest ordered bits are 1's CAM 72 compares the 16 highest ordered bits of encoded value 88 with the 16 highest ordered bits of the query value. Upon determining the query value matches encoded value 88, filter 86A is returned.

To initially store an entry in CAM 72, encoding module 60 first generates an encoded value for a filter. For instance, PFE 58 may initially receive one or more filters that specify one or more exact ports or port ranges. PFE 58 may receive the one or more filters from a policy server (not shown) that includes one or more filters. In other examples, an administrator or other application executing on router 40 may specify one or more filters to be applied by PFE 58 to packet flows. In any case, PFE 58 may receive the one or more filters, which encoding module 60 uses to generate one or more encoded values corresponding to the filters.

As previously described, each encoded value includes three elements. For instance, as shown in FIG. 4, encoded value 88 includes an exact port element 92, frequently occurring port range (FOPR) element 94, and dynamically-learned port rangedynamically-learned port range (DPR) element 96. As shown in FIG. 4, the 16 highest-ordered bits of encoded value 88 comprise exact port element 92, bits 8-15 represent FOPR element 94, and the 8 lowest-ordered bits comprise DPR element 96. Although examples of the present disclosure describe a 32 bit encoded value decomposed into one 16 bit element and two 8 bit elements, techniques of the present disclosure may be applied encoded values of bit sizes other than 32 bits.

In some instances, a filter may specify an exact port value. In such examples, exact port element 92 stores a single port value that represents the exact port specified by the filter. For example, as shown in FIG. 4, exact port value 92 comprises exact port that represents port 6500. Thus, if a filter received by encoding module 60 specifies a single port of 6500, encoding module 60 may generate encoded value 88 and store the port value 6500. Because, in the current example, the filter specifies an exact port, no values are included in FOPR element 94 or DPR index 96. Furthermore, mask 90 comprises 1 values for each of the 16 highest ordered bits and don't care values for the 16 lowest ordered bits. In this way, mask 90 indicates that only the 16 highest ordered bits include port range data for entry 84A. Filter 86A, which includes port 6500, may further be associated with encoded value 88 in entry 84A.

In some examples, encoding module 60 may determine a filter specifies a port range rather than an exact port value. Encoding module 60, applying techniques of the present disclosure, may reduce entries in CAM 72 that represent port ranges by determining whether a specified port range occurs frequently and encoding frequently occurring port ranges as a single entry in CAM 72. For instance, encoding module 60 includes frequently occurring port range (FOPR) store 80. As shown in FIG. 4, FOPR store 80 includes eight entries that each represents a frequently occurring port range. Port ranges of entries stored in FOPR store 80 may in some examples be specified by an administrator or other application executing on router 40. In other examples, encoding module 60 may generate statistics that include frequency data indicating which port ranges occur most frequently in packet flows. FOPR 80 may, for example, be updated by encoding module 60 as the statistics change.

As shown in FIG. 4, entry 116 of FOPR store 80 includes a bit position identifier 102, low extrema port value 104, and high extrema port value 106. Bit position identifier 102 comprises an identifier that uniquely identifies entry 116. Low extrema port 104 comprises a lowest port value of a frequently occurring port range and high extrema 106 comprises a highest port value of the frequently occurring port range.

If encoding module 60 initially receives a filter for encoding and determines that the filter specifies a port range, encoding module 60 further determines whether the port range is included in FOPR store 80. For instance, if the filter specifies a port range of 49152-65536, encoding module 60 may identify bit position identifier 102 associated with the port range in entry 116. Using bit position identifier 102, encoding module 60 may generate encoded value 108. Bits 8-15 of encoded value 108 comprise FOPR identifier 98. FOPR identifier 98 further comprises a bitmap, wherein the ordering of each bit of the bitmap corresponds to a bit position identifier of FOPR store 80. For instance, the lowest ordered bit of FOPR identifier 98 corresponds to the lowest ordered bit position identifier of FOPR store 80.

In the current example, bit position identifier 102 is associated with a port range specified in entry 116 of FOPR store 80. Thus, encoding module 60 may cause CAM 72 to set the third lowest-lowest ordered bit of FOPR identifier 98 to a value of 1. A value of 1 at the third-lowest ordered bit of FOPR identifier 98 indicates that the specified port range associated with filter 86B is identified by bit position identifier 102, e.g., the third lowest ordered bit position identifier of FOPR store 80. In this way, FOPR store 80 may represent a port range specified by a filter using a single bit position identifier. The single bit position identifier, e.g., bit position identifier 102, uses a single entry 84B in CAM 72 to represent port range 49152-65536, thereby reducing the number of entries required to represent the port range in CAM 72. Upon setting the value of FOPR identifier 98, encoding module 60 may further store a mask 110 in entry 84B with 1 values at bit positions of FOPR identifier 98 and don't care values for the remaining bits of encoded value 108 that do not include port range data.

In some examples, encoding module 60 may determine that a filter specifies a port range not included in FOPR store 80. Such port ranges may be described as infrequently occurring or "dynamic" port ranges. For example, a filter 86C may specify a port range of 24001-34000. Initially, encoding module 60 determines if the port range is included FOPR 80. As shown in FIG. 4, port range 24001-34000 is not included in FOPR store 80. Encoder module 60, upon determining the port range is not included in FOPR 80 may determine if port range 24001-34000 is stored in dynamically-learned port rangedynamically-learned port range store 82.

DPR store 82, in some examples comprises a tree structure such as a binary search tree data structure, as shown in FIG. 4. Each node of DPR store 82 represents a dynamically-learned port rangedynamically-learned port range comprising a low extrema and high extrema, which correspond respectively to the lowest port value and highest port value of the dynamically-learned port rangedynamically-learned port range. Each node of DPR store 82 further includes an index value that uniquely identifies the node and therefore the corresponding dynamically-learned port rangedynamically-learned port range represented by the node. The index value may comprise a key value in a binary search tree data structure. Each range of the port values in DPR store 82 is decomposed at the leaf nodes such that no dynamically-learned port rangedynamically-learned port range of any leaf node overlaps with any other leaf node dynamically-learned port rangedynamically-learned port range. For example, as shown in FIG. 4, each leaf node of DPR store 82 comprises a non-overlapping dynamically-learned port rangedynamically-learned port range that is uniquely identified by an index.

In the current example, encoding module 60 determines that port range 24001-34000 is included in DPR store 82. As shown in FIG. 4, index value 7 is associated with the node representing port range 24001-34000. Consequently, encoding module 60 may generate entry 84C in CAM 72 that includes an encoded value 112. Bits 0-7 of encoded value 112 store a DPR index 100. DPR index 100 comprises the index value of DPR 82, e.g., 7, associated with the node that represents port range 24001-34000 in DPR store 82. By representing a dynamically-learned port range in CAM 72 with DPR index 100, fewer CAM entries are required to represent the dynamically-learned port range than if actual port range values are stored in CAM 72. In some examples, if the dynamically-learned port range is not included in DPR store 82, encoding module 60 may generate a new leaf node in DPR store 82 that represents the dynamically-learned port range. The dynamically-learned port range may further be assigned an index value. In some examples, the tree-structure of DPR store 82 may be rebalanced to improve performance. Upon setting the value of DPR index 96, encoding module 60 may further store a mask 114 in entry 84C with 1 values at bit positions of DPR index 100 and don't care values for the remaining bits of encoded value 112 that do not include port range data.

In some examples, when adding a dynamically-learned port range, the port range may be decomposed and stored as separate ranges within DPR store 82 if the dynamically-learned port range overlaps with an existing dynamically-learned port range. For instance, a filter may specify a dynamically-learned port range of 10000-12000. As shown in FIG. 4, no dynamically-learned port range in DPR 82 includes the dynamically-learned port range of 10001-12000. DPR 82 does, however, include dynamically-learned port range 10001-16000 that overlaps with dynamically-learned port range 10000-12000. In such examples, DPR 82 generates a first leaf node that represents a dynamically-learned port range of 10001-12000 and a second leaf node that represents a dynamically-learned port range of 12001-16000. Each of the first and second leaf nodes may be assigned a unique index value and the leaf node 10001-16000 may be deleted. The tree structure of DRP 82 may subsequently be rebalanced to improve efficiency of the data structure. Encoding module 60 may further update entries in CAM 72 that initially included index 3 to represent 10001-16000 and replace each such single entry with two entries that include index values of the generated first and second leaf nodes representing the dynamically-learned port ranges of 10001-12000 and 12001-16000. In this way, DPR 82 may represent many different dynamic ranges efficiently as indexes in CAM 72 and therefore use fewer CAM entries than if actual dynamically-learned port range values were stored in CAM 72.

Figure 5:
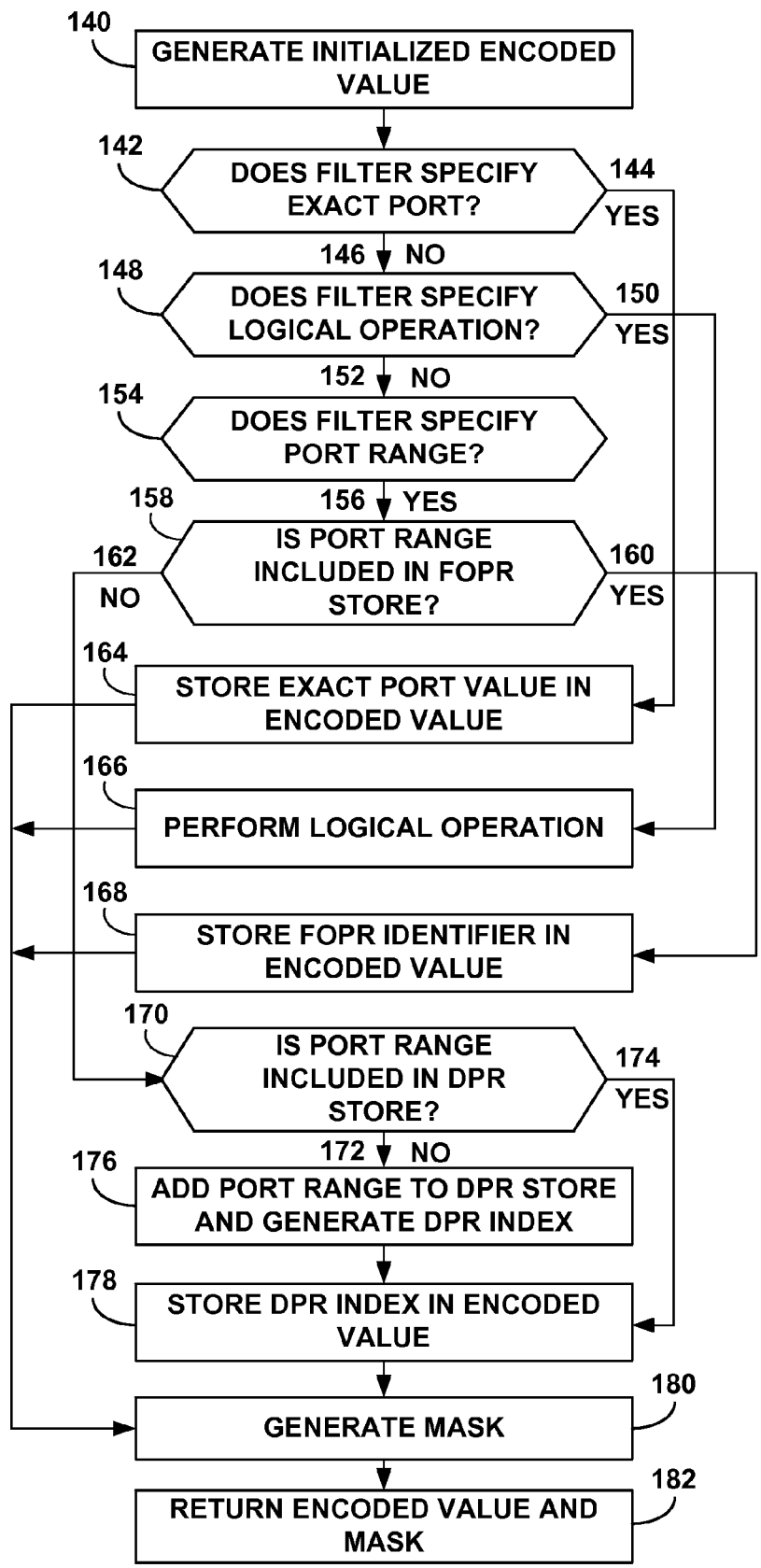
FIG. 5 is a flowchart illustrating an example method to generate an encoded value, in accordance with techniques of this disclosure.

FIG. 5 is a flow chart illustrating an example method to generate an encoded value, in accordance with techniques of this disclosure. The example method of FIG. 5 may be performed by encoder module 60 as shown in FIG. 4. In some examples, the method of FIG. 5 may improve control plane performance and reduce CAM entries required to represent port ranges by encoding port ranges. For example, techniques of the present disclosure may encode frequently used port ranges as single or few CAM entries. The techniques may further encode dynamically-learned port ranges using fewer entries than would be required if such port ranges were represented as actual values in CAM 72. In this way, the example method of FIG. 5 may skip costly range encoding in the control plane for filters that do not specify a range and for filters that do specify a range. The example method of FIG. 5 may further encode frequently occurring port ranges efficiently and handle non-frequently occurring, e.g., dynamically-learned port ranges effectively by representing each dynamically-learned port range as an index value in an encoded value a CAM entry in CAM 72.

To encode a port or port range specified by a filter, PFE 58 may initially receive a filter, e.g., from a policy server, administrator, script or other network device. Encoding module 60 initially receives the filter and generates an initialized, encoded value comprising 32 bits wherein each bit is initialized to zero (140). Encoding module 60 then determines whether the filter specifies an exact port (142). If the filter specifies an exact port (144), encoding module 60 stores the exact port value as the exact port element of encoded value (166). If the filter does not specify an exact port (146), encoding module 60 may determine whether the filter specifies a logical operation (148). If encoding module 60 determines the filter specifies a logical operation (150), encoding module 60 performs the logical operation as further described in the following examples (164).

In some examples, encoding module 60 may provide encoded values that specify logical operations. A logical operation may generate an encoded value that represents a single port, a port range, or multiple port ranges. Encoding module 60 may use logical operations when FOPR store 80 and DPR store 82 do not include capacity to store an additional port range. For instance a filter may specify a port range that is not represented in FOPR store 80 or DPR store 82. Moreover, neither FPOR store 80 nor DPR store 82 may include additional capacity to store the specified port range. In such examples, encoding module 60 may perform a logical operation to generate one or more encoded values that represent the port range.

In one example, an encoded value may represent a logical operation that specifies all port ranges greater than 1024, e.g., >1024. In another example an encoded value may represent a logical operation that specifies all port ranges lower than 65536, e.g., <65536. In still another example an encoded value may represent a logical operation that specifies all port ranges except port 80, e.g. !80. Encoding module 60 may perform logical operations to generate encoded values that represent port ranges. Each logical operation is further described in the following examples.

In one example of a "greater than" logical operation, a filter may specify a port range of all port values greater than 37. The 16-bit binary representation of decimal value 37 is 0000000000100101. In such an example, encoding module 60 may initially determine if 37 is a low extrema value of one or more entries in FOPR store 80. If the port value is a low extrema and the high extrema is 65536, encoding module 60 may select the FOPR identifier associated with the matching port range in FOPR store 80 and further generate an encoded value including the FOPR identifier as described in FIG. 4. For instance, if a logical operation specified all port ranges greater than 1024, encoding module 60 may select the FOPR identifier, e.g., 3, associated with 1024-65536. In the current example, however, the logical operation specifies a range of all port values greater than 37. No entry in FPOR store 80 has 38 as a low extrema of 3678 and a high extrema of 65536.

If no matching entry in FPOR store 80 exists, encoding module 60 generates one or more encoded values that port range values greater than 37 in the following manner. Encoding module 60 first identifies the most significant bit (M) of the binary value of port 37 that includes a value of 1. If the port value includes all 0 values, encoding module 60 generates an encoded value comprising xxxxxxxxxxxxxxxx. In the current example, the binary port value of port 37 is 0000000000100101 and the most significant bit (M) with a 1 value is bit 5. Upon determining bit 5 is a 1, encoding module 60 generates a first encoded value that replaces every 0 value leading bit 5 with a 1, e.g., 11111111111xxxxx. Encoding module 60 generates a second encoded value that replaces every bit trailing M with an x value, e.g., 00000000001xxxxx. For each trailing zero after M, encoding module 60 also generates an encoded value wherein the trailing zero is replaced with a 1 and bit values trailing the 1 value are set to x. In the current example, encoding module 37 generates three encoded values: 000000000011xxxx, 0000000000101xxx, and 000000000010.011x.

In the current example, the resulting set of encoded values that represent all port values greater than 37 include: 11111111111xxxxx, 00000000001xxxxx, 000000000011xxxx, 0000000000101xxx, and 000000000010011x. Encoding module 60 may further generate a 16-bit mask of 1 values for each encoded value to indicate the encoded value represents a port range specified by a logical operation. Each mask and encoded value may be stored in one or more entries of CAM 72.

In one example of a "less than" logical operation, a filter may specify a port range of all port values greater than 45. The 16-bit binary representation of decimal value 45 is 0000000000101101. In such an example, encoding module 60 may initially determine if 44 is a low extrema value of one or more entries in FOPR store 80. If the port value is a low extrema and the high extrema is 65536, encoding module 60 may select the FOPR identifier associated with the matching port range in FOPR store 80 and further generate an encoded value including the FOPR identifier as described in FIG. 4. For instance, if a logical operation specified all port ranges greater than 1024, encoding module 60 may select the FOPR identifier, e.g., 3, associated with 1024-65536. In the current example, however, the logical operation specifies a range of all port values greater than 45. No entry in FPOR store 80 has 45 as a low extrema of 3678 and a high extrema of 65536.

If no matching entry in FPOR store 80 exists, encoding module 60 generates one or more encoded values that port range values greater than 45 in the following manner. Encoding module 60 first identifies the most significant bit (M) of the binary value of port 45 that includes a value of 1. In the current example, the binary port value of port 45 is 0000000000101101 and the most significant bit (M) with a 1 value is bit 5. Upon determining bit 5 is a 1, encoding module 60 generates a first encoded value that replaces bit M with a 0 and all bits trailing M with x values, e.g., 00000000000xxxxx. Encoding module 60 then generates an encoded value for each bit trailing M that includes a 1 value such that for a particular encoded value, the 1 value of the bit is set to a 0 value and all bits trailing the bit set to 0 are set to x. The encoding module 60 may therefore generate the following encoded values: 0000000000100xxx, 00000000001010xx, and 0000000000101100.

In the current example, the group of encoded values that represent all port range values greater than 45 include: 00000000000xxxxx, 0000000000100xxx, 00000000001010xx, and 0000000000101100. Encoding module 60 may further generate a 16-bit mask of 1 values for each encoded value to indicate the encoded value represents a port range specified by a logical operation. Each mask and encoded value may be stored in one or more entries of CAM 72.

In one example of a "not" logical operation, a filter may specify a port range of all port values not equal to 10. In such an example, encoding module 60 initially generates a 1's complement value of the binary value 00001010 that represents 10. For example, a 1's complement of 10 is 11111010. Encoding module 60 then selects the most significant bit (M) and generates an encoded value comprising the most significant bit and sets the remaining bits as "x" values. For instance, encoding module 60 may generate an encoded value of 1xxxxxxx for bit 15. For each lower-ordered bit than M, encoding module 60 generates an encoded value comprising the lowered bit and x values for all bits less than the M and zero bits for all bits greater than M. For instance, the encoded value that represents a port range of all port values not equal to 10 includes: 00000xxx, 0000100x, 000011xx, 0001xxxx, 001xxxxx, 01xxxxxx, 1xxxxxxx. Encoding module 60 generates a mask of 1 values for each encoded value. The masks and corresponding encoded values are then stored in CAM 72.

As shown in FIG. 5, if encoding module 60 determines the filter does not specify a logical operation (152), encoding module 60 determines if the filter specifies a port range (156). If the filter specifies a port range, encoding module 60 determines if the specified port range is included in FOPR store 80 (158). If the port range is included in FOPR store 80 (160), encoding module 69 selects the FOPR identifier associated with the port range and stores the FOPR identifier in the encoded value (168). If the port range is not included in FOPR store 80 (162), encoding module 60 determines if the port range is included in DPR store 82 (170). If the port range is included in DPR store 82 (174), encoding module 60 selects the DPR index associated with the port range and stores the DPR index in the encoded value (178). If the port range is not included in DPR store 82, encoding module 60 adds the port range as a dynamically-learned port range in DPR store 82 as described in FIG. 4 (178).

In the example method of FIG. 5, once encoding module 60 has generated the encoded value representing the exact port value or port range, encoding module 60 further generates a mask (180). The mask includes 1 values for each element of the encoded value that stores data indicating the exact port or port range as described in FIG. 4. Encoding module 60 then returns the encoded value and mask, which are stored in CAM 72.

After encoding module 60 has stored encoded values representing port ranges of one or more filters in CAM 72, the encoded values may later be selected by encoding module 60 when packets are received by PFE 58 that specify exact port values or port ranges. Initially, when PFE 58 receives a packet, forwarding ASICs 70 may select IP header information included with the packet. The IP header information may specify the source IP address, destination IP address, source port, destination port, and protocol. Forwarding ASICs 70 may select the source and destination port information from the IP header.

In order to select filters from CAM 72 that specify the source and destination port values of the IP header, encoding module 60 generates a query value to query the encoded values of CAM 72. For example, CAM 72 returns each filter associated with an encoded value that matches the query value. The filters returned by CAM 72 are then loaded into forwarding ASICs 70, which applies the filters to the packet. To generate the query value, encoding module 60 uses the following example technique that is substantially similar to the method of FIG. 5.

Initially, forwarding ASICs 70 may, in the current example, select the source port information from the IP header of the packet, which is sent to encoding module 60. Encoding module 60 generates an initialized 32-bit query value comprising all zero value bits. Encoding module 60 then stores the exact port value in the exact port element of the query value. For instance, the exact port element of the query value may be the 16 highest ordered bits of the query value.

After storing the exact port value in the exact port element, encoding module 60 determines if the source port of the packet is included in one or more ranges of FOPR store 80. In the current example, bits 8-15 of the query value comprise a FOPR identifier. As described in FIG. 4 the FOPR identifier may comprise a bitmap wherein each bit position in the bitmap corresponds to an entry in FOPR store 80. Thus, in the current example, if the source port of the packet is included in port ranges of the first and third port ranges of FOPR store 80, encoding module 60 sets bits 8 and 10 of the FOPR identifier to a value of 1. By setting bits 8 and 10 to a value of 1, the FOPR identifier indicates that the source port is included in the first and third port range entries of FOPR store 80.

Next, encoding module 60 queries DPR store 82 to determine if the source port of the packet is included in dynamic range. If the source port is included in a dynamic range represented in DPR store 82, encoding module 60 selects the index value associated with the dynamically-learned port range that includes the source port. Encoding module 60 further stores the index value in the DPR index value element of the query value. For instance, the 8 lowest ordered bits of the query value may comprise the DPR index value element. Consequent, the index value may be stored in the 8 lowest ordered bits.

After encoding module 60 has generated the query value, encoding module 60 queries CAM 72 using the query value. CAM 72 compares the query value to each encoded value in a single clock cycle and returns each filter associated with an encoded value that matches the query value. The set of filters returned by CAM 72 are then programmed by PFE 58 into forwarding ASICs 70. Forwarding ASICs 70 then apply the filters to the packet and the packet is routed accordingly by the forwarding ASICs. In this way, techniques of the present disclosure implemented in encoding module 60 may be used to select filters to be applied to packets based on the port information included in a particular packet.

Various embodiments of the invention have been described. These and other embodiments are within the scope of the following claims.

The invention claimed is:

1. A method comprising:
generating, by a computing device, an encoded value that represents a specified port range comprising:
a first element storing an identifier that identifies a frequently occurring port range stored in an associative data structure of most frequently occurring port ranges,
a second element storing an index that represents a dynamically-learned port range specifying at least a part of the specified port range, the dynamically-learned port range represented in a tree-structure of dynamically-learned port ranges and identified by the index;

receiving, by the computing device, a packet that indicates a port value;

generating, by the computing device, a query value based at least on the port value;

selecting, by the computing device, one or more filters using a content-addressable data structure that indicates an association between the encoded value and the one or more filters, wherein the encoded value matches the query value; and applying, by a forwarding plane of the computing device, the one or more filters associated with the encoded value to the packet that indicates the port.

2. The method of claim 1, further comprising:
determining, by the computing device, a port range specified by a filter; and
querying, by the computing device, the associative data structure of most frequently occurring port ranges to determine if the specified port range is included in the associative data structure of most frequently occurring port ranges.

3. The method of claim 2, wherein if the specified port range is included in the associative data structure of most frequently occurring port ranges, generating the encoded value to store the identifier that identifies the frequently occurring port range in the first element of the encoded value.

4. The method of claim 2, wherein if the specified port range does not match the most frequently occurring port range, storing one or more dynamically-learned port ranges in the tree data structure to represent the port range specified by the filter, wherein the dynamically-learned port ranges are uniquely represented by one or more indexes; and
generating the encoded value to store the one or more indexes in the second element of the encoded value.

5. The method of claim 4, further comprising:
determining, by the computing device, the specified port range overlaps with at least one dynamically-learned port range in the tree-structure of dynamically-learned port ranges; and
splitting, by the computing device, the at least one dynamically-learned port range into multiple dynamically-learned port ranges in the tree-structure of dynamically-learned port ranges, wherein at least one of the multiple dynamically-learned port ranges represents the specified port range and wherein each of the multiple dynamically-learned port ranges not representing the specified port range represents a subset of the at least one dynamically-learned port range in the tree-structure of dynamically-learned port ranges.

6. The method of claim 1, wherein if the specified port range comprises a single port value,
storing, by the computing device, the single port value in a third element of the encoded value.

7. The method of claim 1, wherein generating the query value based at least on the port value further comprises:
selecting, by the computing device, the port value of the packet; and
storing, by the computing device, the port value in the query value.

8. The method of claim 1, wherein generating the query value based at least on the port value further comprises:
selecting, by the computing device, the port value of the packet;
comparing, by the computing device, the port value to one or more port ranges of the associative data structure that stores most frequently occurring port ranges;
selecting, by the computing device, one or more frequently occurring port range identifiers associated with one or more port ranges of the associative data structure that include the port value; and
storing, by the computing device, the one or more frequently occurring port range identifiers in the query value.

9. The method of claim 1, wherein generating the query value based on at least the port value further comprises:
selecting, by the computing device, the port value of the packet;
comparing, by the computing device, the port value to one or more port ranges of tree-structure of dynamically-learned port ranges;
selecting, by the computing device, a dynamically-learned port range index associated with a dynamically-learned port range of the tree-structure of dynamically-learned port ranges that include the port value; and
storing, by the computing device, the dynamically-learned port range index in the query value.

10. The method of claim 1, further comprising:
generating, by the computing device, a mask, wherein the mask comprises data indicating if the first element stores the identifier that identifies a frequently occurring port range or the second element stores the index that represents the dynamically-learned port range specifying at least a part of the specified port range; and
storing, by the computing device, the mask and the encoded value in a content addressable data structure.

11. The method of claim 1, further comprising:
determining, by the computing device, a group of most frequently occurring port ranges based at least on one or more packet flows;
storing, by the computing device, the group of most frequently occurring port ranges in the associative data structure of most frequently occurring port ranges;
determining, by the computing device, an observed port range in a second packet flow occurs more frequently than at least one of the most frequently occurring port ranges in the associative data structure; and
replacing, by the computing device, the at least one of the most frequently occurring port ranges in the associative data structure with the observed port range.

12. A network device comprising:
an encoding module that:
generates an encoded value that represents a specified port range comprising:
a first element storing an identifier that identifies a frequently occurring port range stored in an associative data structure of most frequently occurring port ranges,
a second element storing an index that represents a dynamically-learned port range specifying at least a part of the specified port range, the dynamically-learned port range represented in a tree-structure of dynamically-learned port ranges and identified by the index;
a forwarding plane that receives a packet that indicates a port value;
wherein the encoding module:
generates a query value based at least on the port value;
selects one or more filters using a content-addressable data structure that indicates an association between the encoded value and the one or more filters, wherein the encoded value matches the query value; and wherein the forwarding plane applies the one or more filters associated with the encoded value to the packet that indicates the port.

13. The network device of claim 12, wherein the encoding module determines a port range specified by a filter; and wherein the encoding module queries the associative data structure of most frequently occurring port ranges to determine if the specified port range is included in the associative data structure of most frequently occurring port ranges.

14. The network device of claim 12, wherein if the specified port range is included in the associative data structure of most frequently occurring port ranges, the encoding module generates the encoded value to store the identifier that identifies the frequently occurring port range in the first element of the encoded value.

15. The network device of claim 12, wherein if the specified port range does not match the most frequently occurring port range, the encoding module stores one or more dynamically-learned port ranges in the tree data structure to represent the port range specified by the filter, wherein the dynamically-learned port ranges are uniquely represented by one or more indexes; and generating the encoded value to store the one or more indexes in the second element of the encoded value.

16. The network device of claim 15, wherein the encoding module determines the specified port range overlaps with at least one dynamically-learned port range in the tree-structure of dynamically-learned port ranges; and wherein the encoding module splits the at least one dynamically-learned port range into multiple dynamically-learned port ranges in the tree-structure of dynamically-learned port ranges, wherein at least one of the multiple dynamically-learned port ranges represents the specified port range and wherein each of the multiple dynamically-learned port ranges not representing the specified port range represents a subset of the at least one dynamically-learned port range in the tree-structure of dynamically-learned port ranges.

17. The network device of claim 12, wherein if the specified port range comprises a single port value, the encoding module stores the single port value in a third element of the encoded value.

18. The network device of claim 12, wherein the encoding module selects the port value of the packet; and wherein the encoding module stores the port value in the query value.

19. The network device of claim 12, wherein the encoding module selects the port value of the packet;

wherein the encoding module compares the port value to one or more port ranges of the associative data structure that stores most frequently occurring port ranges;

wherein the encoding module selects one or more frequently occurring port range identifiers associated with one or more port ranges of the associative data structure that include the port value; and wherein the encoding module stores the one or more frequently occurring port range identifiers in the query value.

20. The network device of claim 12, wherein the encoding module selects the port value of the packet;

wherein the encoding module compares the port value to one or more port ranges of tree-structure of dynamically-learned port ranges;

wherein the encoding module selects a dynamically-learned port range index associated with a dynamically-learned port range of the tree-structure of dynamically-learned port ranges that include the port value; and wherein the encoding module stores the dynamically-learned port range index in the query value.

21. The network device of claim 12, wherein the encoding module generates a mask, wherein the mask comprises data indicating if the first element stores the identifier that identifies a frequently occurring port range or the second element stores the index that represents the dynamically-learned port range specifying at least a part of the specified port range; and wherein the encoding module stores the mask and the encoded value in a content addressable data structure.

22. The network device of claim 12, wherein the encoding module determines a group of most frequently occurring port ranges based at least on one or more packet flows;

wherein the encoding module stores the group of most frequently occurring port ranges in the associative data structure of most frequently occurring port ranges;

wherein the encoding module determines an observed port range in a second packet flow occurs more frequently than at least one of the most frequently occurring port ranges in the associative data structure; and wherein the encoding module replaces the at least one of the most frequently occurring port ranges in the associative data structure with the observed port range.

* * * * *